United States Patent
Chakraborty et al.

(10) Patent No.: US 9,438,456 B1
(45) Date of Patent: Sep. 6, 2016

(54) SYSTEMS AND METHODS OF POLYPHASE GENERATION

(71) Applicant: Texas Instruments Incorporated, Dallas, TX (US)

(72) Inventors: Sudipto Chakraborty, Richardson, TX (US); Swaminathan Sankaran, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/887,566

(22) Filed: Oct. 20, 2015

(51) Int. Cl.
*H04L 27/20* (2006.01)

(52) U.S. Cl.
CPC .................... *H04L 27/20* (2013.01)

(58) Field of Classification Search
CPC ........... H04L 27/2092; H04L 27/2071; H04L 27/0008; H04L 27/18; H04L 27/2017; H04L 25/03834; H04L 27/12; H04L 1/0003; H04L 1/0071; H04L 5/0007; H04L 1/0009; H03B 28/00; H03C 3/40

USPC .......... 375/308, 302, 295, 219, 316
See application file for complete search history.

(56) References Cited

U.S. PATENT DOCUMENTS

2011/0092169 A1* 4/2011 Savoj ............ H03H 7/21
455/73

* cited by examiner

*Primary Examiner* — Zewdu Kassa

(74) *Attorney, Agent, or Firm* — John R. Pessetto; Frank D. Cimino

(57) ABSTRACT

Example embodiments of the systems and methods of polyphase generation involve quadrature generation in high frequency digital transceivers. An oscillation signal is received and converted to complex variables with lead and lag phase rotation while performing compensation and calibration due to non-idealities of the in-phase and quadrature phase component parts. In addition to orthagonalizating, the quadrature generator also provides signal amplification and filtering. The quadrature phase generation scheme may be extended to odd harmonics of the fundamental frequency at the input.

20 Claims, 3 Drawing Sheets

US 9,438,456 B1

SYSTEMS AND METHODS OF POLYPHASE GENERATION

TECHNICAL FIELD

The present disclosure is generally related to telecommunications and, more particularly, is related to digital wireless transceivers.

BACKGROUND

In digital communications, a carrier with modulation implemented either in amplitude, frequency, or phase can be decomposed into, or synthesized from, two band pass modulated sinusoids that are offset in phase by one-quarter cycle (π/2 radians). The orthogonal basis functions used to implement modulation or demodulation are known as in-phase and quadrature components.

Consider the two axes of the Cartesian plane: an in-phase axis (x-axis) that is a zero degree axis and the quadrature axis (y-axis) that is a ninety degree axis (the phase plane). The input signal, which is an input vector, may occur anywhere in that plane. It can rotate anywhere in the (x,y) plane. It can occur in any of the four quadrants of that phase plane. The vector may be represented as a combination of some components in the x-axis and the y-axis so that the sum of the squares of the individual projections equals to the square of the magnitude that is contained in the vector—it is a vector in the X and Y components, or a Cartesian representation of a vector. The quadrature component may be used in digital communication systems to perform image rejection and improve data density.

One example quadrature component generator, as shown in FIG. 1A, uses voltage controlled oscillator (VCO) 105, buffer 110, and divide by two network 115, which may be, for example, two D latches connected in a positive feedback loop. This generates an in-phase and a quadrature wave forms at half the VCO frequency, which is a 90 degree phase shifted version of the in-phase component. The output of divide by two network 115 is filtered with LC tuned filter 120 and then provided to mixer 125. In that scheme, quadrature generation is accurate but the VCO operates at twice the output frequency. This leads to the divider consuming high current, which may be prohibitive as the frequencies increase.

In another example, as shown in FIG. 1B, LC-tuned filter 135 filters the output of VCO 130 to reject the harmonics and produce a pure sinusoid signal. The sinusoid signal is then applied to poly-phase IQ generator 140, which comprises, for example, a network of resistors and capacitors to produce a phase lead and a phase lag. This network creates a phase lead of 45 degrees and a phase lag of 45 degrees, which results in a total phase difference of 90 degrees between the two output phases. The resulting signal is again filtered with LC-tuned filter 145 and then on to mixer 150 for functional uses. A disadvantage of the signal generation scheme is that quadrature generation using passive polyphase phase shifter 140 provides large signal loss, so a buffer may be used after poly-phase filter 140 to compensate for the signal loss. This buffer at the output of poly-phase filter 140 consumes additional current and contributes noise.

Another scheme, as shown in FIG. 1C, uses two cross coupled oscillators, VCOI 160 and VCOQ 170. The current consumption is comparatively high. In this scheme, the phase noise adds up uncorrelated to produce high spectral content. Quadrature phase generation with harmonic filtering of the reference oscillation signal is fundamental to any wireless transceiver that provides moderate-to-high selectivity. As shown above, conventional RF techniques involve oscillating at twice the required frequency followed by a divide by two block for IQ generation. Previous techniques using transmission line based hybrid I/Q generation techniques are limited due to being bulky and area inefficient, lossy and power inefficient, limited in phase shift and quadrature accuracy, and limited in rejection of higher order harmonics. There are heretofore unaddressed needs with these previous solutions.

SUMMARY

Example embodiments of the present disclosure provide systems of polyphase generation. Briefly described, in architecture, one example embodiment of the system, among others, can be implemented as follows: a phase shifter block comprising at least one configurable capacitor, the phase shifter block configured to: receive an oscillation signal; receive a feedback control signal for adjusting the at least one configurable capacitor; and generating an in phase (I) component and quadrature phase (Q) component from the oscillation signal; and a calibration block configured to output the feedback control signal based on a vector product of the I and Q components.

Embodiments of the present disclosure can also be viewed as providing methods for polyphase generation. In this regard, one embodiment of such a method, among others, can be broadly summarized by the following steps: receiving an oscillation signal; generating an in phase (I) component and a quadrature phase (Q) component from the oscillation signal; and calibrating the generating of the I and Q components based on a vector product of the I and Q components.

DETAILED DESCRIPTION

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Example embodiments of the systems and methods of polyphase generation involve quadrature generation in high frequency digital transceivers. An oscillation signal is received and converted to complex variables with lead and lag phase rotation while performing compensation and calibration due to non-idealities of the in-phase and quadrature phase component parts. In generating the quadrature component part the input oscillation signal is orthogonalized.

Example embodiments of the systems and methods of polyphase generation disclosed herein include two independent LC resonator circuits with a first LC resonator circuit programmed at a frequency offset of +Δf and a second LC resonator circuit programmed at the negative of the same frequency offset of −Δf from the desired resonance frequency, $f_{RF}$. For I/Q component generation, Δf may be chosen to maintain a relative phase difference of ninety degrees between the outputs of the first and second LC resonator circuits. As a result, amplitudes of the two outputs are equal.

Figure 1A:
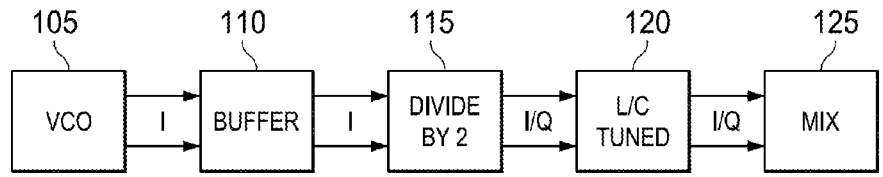
FIG. 1A is a system block diagram of an example embodiment of a previous system of polyphase generation using a divide by two network.
Figure 1B:
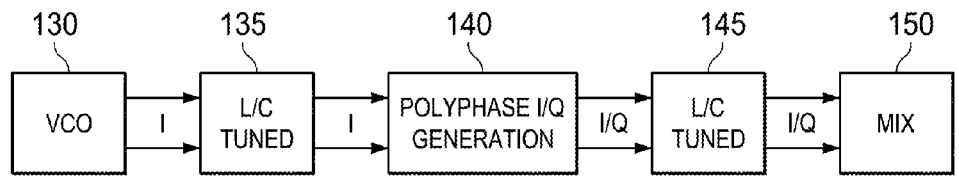
FIG. 1B is a system block diagram of an example embodiment of a previous system of polyphase generation using a resistance-capacitance based passive network.
Figure 1C:
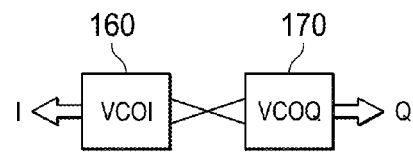
FIG. 1C is a system block diagram of an example embodiment of a previous system of polyphase generation using cross coupled voltage controlled oscillators.
Figure 2:
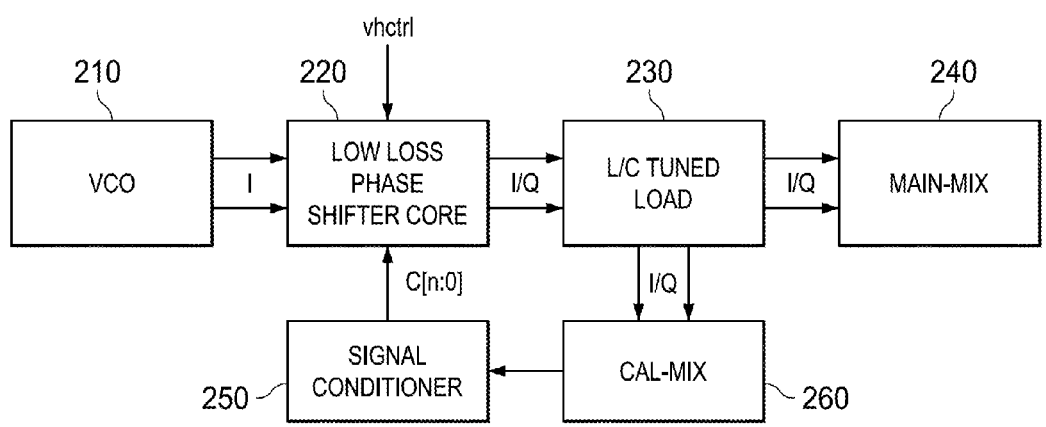
FIG. 2 is a system block diagram of an example embodiment of a system of polyphase generation.

FIG. 2 provides an example embodiment of a system of polyphase generation in which the output of VCO 210 (only uses a single VCO, which keeps the current consumption low) is passed through low-loss phase shifter 220, then into LC-tuned buffer 230, and then out to mixer 240 for the main I and Q signals. The I and Q signals are also sent from LC-tuned buffer 230 to calibration mixer 260 which outputs a DC value proportional to the phase error between the two quadrature phases. This may be used to align the quadrature component. An example implementation employs amplifier and calibration ADC as signal conditioner 250 to generate code for a trim capacitor example in low-loss phase shifter 220.

Figure 3:
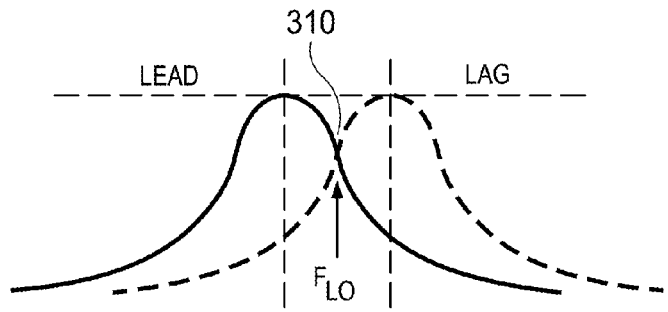
FIG. 3 is a signal diagram of an example embodiment of the lag and lead signals produced by the system of FIG. 2.
Figure 4A:
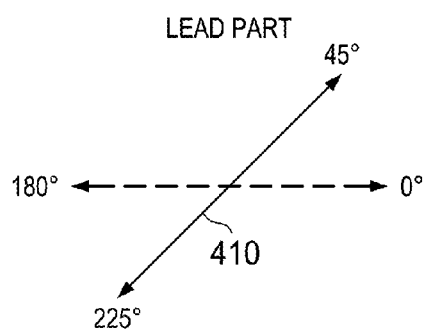
FIG. 4A is a signal diagram of an example embodiment of the lead portion of the diagram of FIG. 3.
Figure 4B:
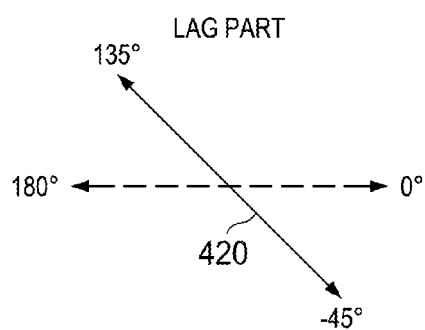
FIG. 4B is a signal diagram of an example embodiment of the lag portion of the diagram of FIG. 3.

In an example embodiment, low-loss phase shifter is driven by a differential signal from the VCO. Low-loss phase shifter 220 comprises a lead-lag network where the LC resonator provides, as shown on FIG. 3, a 45 degree phase shift of the signal at 3 dB point 310 such that $\omega_1 L_1 Q_1 = \omega_2 L_2 Q_2$, producing the local oscillator frequency $F_{LO}$. The same signal may be applied to two resonator tanks to produce lead part 410 of FIG. 4A and lag part 420 of FIG. 4B. These tanks may be calibrated by ensuring that the vector product of the I and Q components approaches zero to ensure quadrature.

To calibrate low loss phase shifter 220, the error in the vector product is minimized. The output voltage can be determined as $$V_{out} = \alpha A \cos(\omega_c t) \times \cos(\omega_c t + \Delta + \frac{\pi}{2})$$
$$= \alpha A [\cos(2\omega_c t + \Delta + \frac{\pi}{2}) + \cos(\Delta + \frac{\pi}{2})]$$

LPF( )=αA cos( )=−αA sin Δ≅−αAΔ for a small phase error. and ADC(—αΔ)$\xrightarrow{yields}$ code: C[n:0] The capacitor code may be adjusted until Δ is close to zero (or lower than a tolerance). Measurement of the phase error is at DC, which improves accuracy.

In an example embodiment the calibration may be implemented by non-limiting examples of at least one of varactor/MOSCAP, switched capacitors at low frequency, switchable capacitor or bias adjustable capacitor array, transformer based tunable inductor, and capacitor coupled input to the calibration mixer. The vhctrl signal for low loss phase shifter 220 adjusts the DC voltage level and controls the harmonic generation. Harmonic content is filtered by the 1/f2 rejection profile of the LC filter, which can work with large harmonic content at the input (for example, a square wave).

Figure 5:
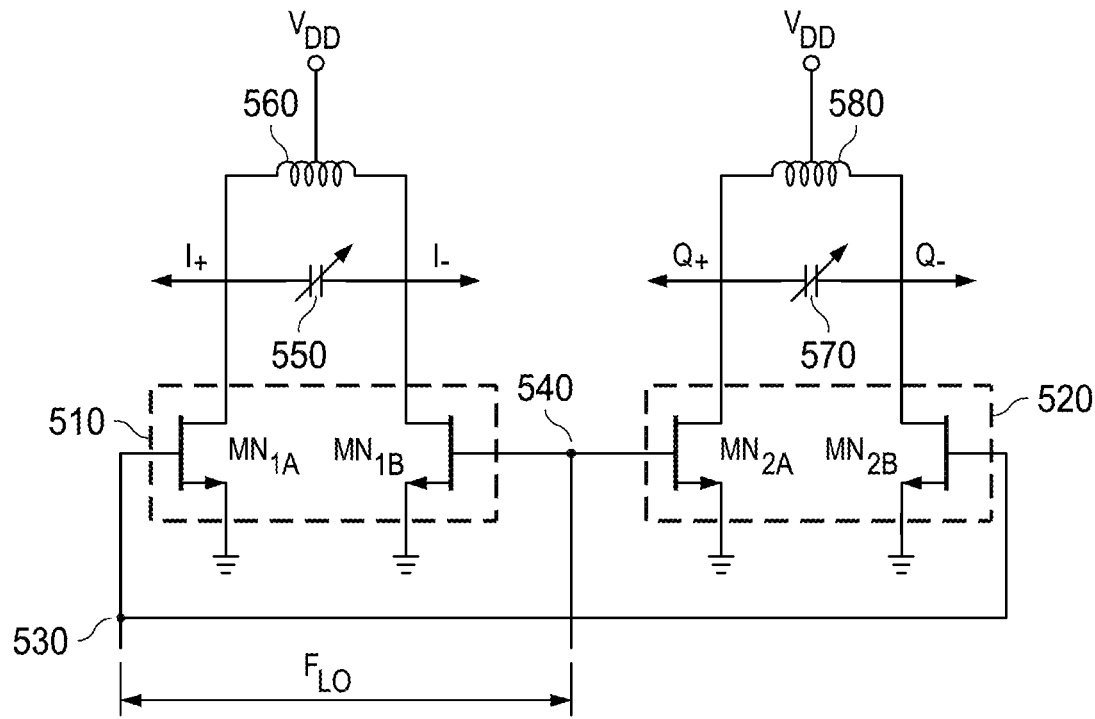
FIG. 5 is a circuit diagram of an example embodiment of the system of polyphase generation of FIG. 2.

FIG. 5 provides a circuit diagram of an example embodiment of a system of polyphase generation, including first differential pair 510, second differential pair 520, first input 530, second input 540, first configurable capacitor 550, first inductor 560, second configurable capacitor 570, and second inductor 580. Tuning elements for the circuit of FIG. 5 include one or more of a varactor/MOSCAP, switched capacitors at low frequency, switchable capacitor or bias adjustable capacitor array, transformer based tunable inductor, and capacitor couples input to the calibration mixer. The input to the poly-phase shifter is demarcated by $F_{LO}$ as the input across first input 530 and second input 540. The DC voltage at first input 530 and second input 540 (which may be the same voltage) adjusts the harmonic wave forms at the output. This DC voltage controls the linearity of the active input stages of the poly-phase filter. The 3rd, 5th and 7th harmonics are generated and the even harmonics are rejected.

If the odd harmonics are generated, then the poly-phase generation is still valid. The odd harmonics may be generated by adjusting the vhctrl signal in the output tuning of the LC network. The components of the LC tuned load are adjusted such that the lead-lag phase shifts are obtained at the desired harmonic frequency. An example embodiment of the systems and methods of polyphase generation disclosed herein combine a frequency multiplier, a phase shifter, a quadrature generator, and filtering without spending additional area and while sharing the same current. This configuration also results in self-calibration to improve phase accuracy.

The generated quadrature phases are combined to produce the $\cos(\omega_c T)$ term, ultimately producing the product and the difference of the two terms. The result is low-pass filtered to produce sin Δ (a small delta offset). Approximating yields −αAΔ.

In an example embodiment, the transistors are differential pairs, which may be implemented in many ways, one of which is provided in FIG. 5. The VCO is differential in nature; but, in the event that the VCO is single-ended, first differential pair 510 and second differential pair 520 may also be configured to convert from a single-ended signal to a differential signal. The input DC bias level of first differential pair 510, second differential pair 520 (designated as vhctrl in FIG. 2) drives the transistor into an operating condition in which the differential pairs operate with emphasis on one harmonic more than another.

The differential input pair can be configured in many other ways as well. Instead of connecting the source terminals of $MN_{1A}$ and $MN_{1B}$ to ground, they may be tied to a transistor based current source in case voltage headroom is available. If it is desired to operate them as single-ended, one of the input sides (530 or 540) may be grounded.

Figure 6:
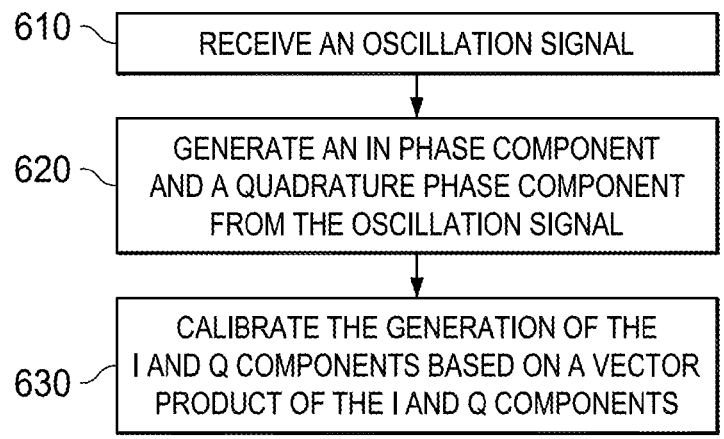
FIG. 6 is a flow diagram of an example embodiment of a method of polyphase generation.

FIG. 6 provides a flow chart of an example embodiment of a method of polyphase generation. In block 610, an oscillation signal is received. In block 620, an in phase (I) component and a quadrature phase (Q) component is generated from the oscillation signal. In block 630, the generating of the I and Q components is calibrated based on a vector product of the I and Q components.

The flow chart of FIG. 6 shows the architecture, functionality, and operation of a possible implementation of the polyphase generation method. In this regard, each block represents a function(s). It should be noted that in some alternative implementations, the functions noted in the blocks may occur out of the order noted in FIG. 6. For example, two blocks shown in succession in FIG. 6 may in fact be executed substantially concurrently or the blocks may sometimes be executed in the reverse order, depending upon the functionality involved.

Although the present disclosure has been described in detail, it should be understood that various changes, substitutions and alterations can be made thereto without departing from the spirit and scope of the disclosure as defined by the appended claims.

The invention claimed is:

1. A system comprising:
a phase shifter block with configurable bias current comprising at least one configurable capacitor, the phase shifter block configured to:
receive an oscillation signal;
receive a feedback control signal for adjusting the at least one configurable capacitor and the bias current; and
generating an in phase (I) component and quadrature phase (Q) component from the oscillation signal; and
a calibration block configured to output the feedback control signal based on a vector product of the I and Q components;
a control circuit configured to adjust the at least one configurable capacitor based on a vector product of the I and Q components.

2. The system of claim 1, wherein the phase shifter block is configured to receive an harmonic control signal for selecting odd harmonics and rejecting even harmonics of the I and Q components.

3. The system of claim 2, wherein the harmonic control signal comprises a direct current (DC) bias signal at an oscillation input to the phase shifter block.

4. The system of claim 1, wherein the calibration block comprises a calibration mixer configured to mix the I and Q components to produce the vector product.

5. The system of claim 4, wherein the calibration block further comprises an analog to digital converter (ADC) configured to receive the mixed I and Q components and to generate the feedback control signal.

6. The system of claim 4, further comprising an inductor/capacitor (LC) filter configured to receive the I and Q components and harmonics of the I and Q components, to filter the components with a $1/(f^2)$ rejection profile, and to output the filtered components to the calibration mixer.

7. The system of claim 1, wherein the phase shifter block comprises:
a first resonator configured to provide a forty-five degree lead of the oscillation signal; and
a second resonator configured to provide a forty-five degree lag of the oscillation signal.

8. The system of claim 7, wherein the first and second resonators comprise at least one of varactor/MOSCAP, switched capacitors at low frequency, switchable capacitor or bias adjustable capacitor array, transformer based tunable inductor, and capacitor couples input to the calibration mixer.

9. The system of claim 7, wherein the first and second resonators are configured to provide the forty-five degree lead and the forty-five degree lag at a −3 dB point.

10. A method comprising:
a phase shifter block with configurable bias current comprising at least one configurable capacitor, the phase shifter block configured to:
receive an oscillation signal;
generate an in phase (I) component and a quadrature phase (Q) component from the oscillation signal; and
calibrate the generating of the I and Q components based on a vector product of the I and Q components;
adjust the at least one configurable capacitor based on the vector product of the I and Q components.

11. The method of claim 10, wherein generating the I and Q components comprises generating a forty-five degree lead and a forty-five degree lag of the oscillation signal.

12. The method of claim 11, wherein the forty-five degree lead and the forty-five degree lag intersect at a −3 dB point in amplitude relative to their peak amplitude.

13. The method of claim 10, wherein generating the I and Q components comprises selecting add harmonics by applying a direct current (DC) signal.

14. The method of claim 10, wherein the vector product is generated by mixing the I and Q components.

15. The method of claim 10, further comprising converting the vector product of the I and Q components to a digital control signal, the digital control signal used in calibrating the generating of the I and Q components.

16. A circuit comprising:
a pair of differential transistors configured to receive an input oscillation signal across the pair and output an in phase (I) component from a first differential transistor of the pair and a quadrature phase (Q) component from a second differential transistor of the pair;
a first configurable capacitor across the first differential transistor to produce a forty-five degree lead of the input oscillation signal;
a second configurable capacitor across the second differential transistor to produce a forty-five degree lag of the input oscillation signal; and
a control circuit configured to adjust the first and/or second configurable capacitors based on a vector product of the I and Q components.

17. The circuit of claim 16, wherein the control circuit comprises a mixer configured to produce the vector product.

18. The circuit of claim 17, wherein the control circuit comprises an analog to digital converter (ADC) configured to convert the vector product to a digital signal for adjusting the first and/or second configurable capacitors.

19. The circuit of claim 16, further comprising a filter comprising inductors and capacitors, the filter configured to filter the I and Q components with a $1/(f^2)$ profile.

20. The circuit of claim 16, wherein the pair of differential transistors is configured to receive a direct current (DC) bias level for generating harmonics of the I and Q components.

* * * * *